United States Patent
Pan et al.

(10) Patent No.: US 11,981,604 B2
(45) Date of Patent: May 14, 2024

(54) CONCRETE CRACK REPAIR MATERIAL BASED ON NANO MATERIALS AND ITS PREPARATION METHOD

(71) Applicant: NingboTech University, Ningbo (CN)

(72) Inventors: Chonggen Pan, Ningbo (CN); Yu Hu, Ningbo (CN); Shiyang Qu, Ningbo (CN); Jiawei Zang, Ningbo (CN)

(73) Assignee: NingboTech University, Ningbo (CN)

( * ) Notice: Subject to any disclaimer, the term of this patent is extended or adjusted under 35 U.S.C. 154(b) by 0 days.

(21) Appl. No.: 18/316,984

(22) Filed: May 12, 2023

(65) Prior Publication Data

US 2023/0382799 A1 Nov. 30, 2023

(30) Foreign Application Priority Data

May 26, 2022 (CN) .......................... 202210581415.7

(51) Int. Cl.
| | |
|---|---|
| *C04B 28/06* | (2006.01) |
| *C04B 14/04* | (2006.01) |
| *C04B 14/06* | (2006.01) |
| *C04B 16/06* | (2006.01) |
| *C04B 18/08* | (2006.01) |
| *C04B 18/14* | (2006.01) |
| *C04B 18/24* | (2006.01) |
| *C04B 22/14* | (2006.01) |
| *C04B 24/04* | (2006.01) |
| *C04B 24/16* | (2006.01) |
| *C04B 24/28* | (2006.01) |
| *C04B 40/00* | (2006.01) |
| *C04B 103/30* | (2006.01) |
| *C04B 103/32* | (2006.01) |
| *C04B 103/61* | (2006.01) |
| *C04B 111/00* | (2006.01) |
| *C04B 111/72* | (2006.01) |

(52) U.S. Cl.
CPC .......... *C04B 28/065* (2013.01); *C04B 14/045* (2013.01); *C04B 14/06* (2013.01); *C04B 16/0683* (2013.01); *C04B 18/08* (2013.01); *C04B 18/146* (2013.01); *C04B 18/248* (2013.01); *C04B 22/14* (2013.01); *C04B 24/04* (2013.01); *C04B 24/16* (2013.01); *C04B 24/28* (2013.01); *C04B 40/0046* (2013.01); *C04B 2103/302* (2013.01); *C04B 2103/32* (2013.01); *C04B 2103/61* (2013.01); *C04B 2111/00508* (2013.01); *C04B 2111/72* (2013.01)

(58) Field of Classification Search
CPC ..... C04B 28/065; C04B 14/045; C04B 14/06; C04B 18/08; C04B 18/146; C04B 22/14; C04B 24/04; C04B 24/16; C04B 24/28; C04B 40/0046; C04B 16/0683; C04B 18/248

See application file for complete search history.

(56) References Cited

U.S. PATENT DOCUMENTS

2018/0111876 A1* 4/2018 Zampini ............. C04B 16/0625

FOREIGN PATENT DOCUMENTS

CN 107445545 A 12/2017

OTHER PUBLICATIONS

Li Guomin, Design Practice of Rock Core Drilling Engineering, Sep. 2015, pp. 235-236, Metallurgical Industry Press, China.
Qian Huili, Application Technology of Premixed Mortar, Apr. 2015, pp. 167-168, China Building Materials Industry Press, China.
Zhang Bin, Handbook of Concrete Admixtures and Their Applications, Nov. 2012, pp. 208-211, Tianjin University Press, China.
Fujian Wujiaohua Company, Chemical Commodity Knowledge, Nov. 1985, p. 222, Fujian Science and Technology Publishing House, China.
CNIPA, Notification of a First Office Action for CN202210581415.7, dated Jul. 29, 2022.
Ningbo Tech University, Ningbo Nanowei New Material Technology Co., Ltd. (Applicants), Reply to Notification of a First Office Action for CN202210581415.7, w/ replacement claims, dated Sep. 21, 2022.
Ningbo Tech University, Ningbo Nanowei New Material Technology Co., Ltd. (Applicants), Supplemental Reply to Notification of a First Office Action for CN202210581415.7, w/ (allowed) replacement claims, dated Oct. 13, 2022.
CNIPA, Notification to grant patent right for invention in CN202210581415.7, dated Oct. 21, 2022.

* cited by examiner

*Primary Examiner* — John E Uselding

(57) ABSTRACT

A concrete crack repair material based on nano materials includes raw materials as follows: seaweed, sulphoaluminate cement, natural sand, nano-silica fume, calcium formate, fly ash, anhydrous calcium sulphoaluminate, a polyester fiber, a water reducing agent, a corrosion inhibitor and water. By reasonably selecting the raw materials of the concrete crack repair material and making a reasonable ratio of the raw materials, the concrete crack repair material is obtained with excellent performance such as good compressive strength, bending strength and bond strength, and excellent impermeability and frost resistance. The concrete crack repair material can be used for the concrete crack repair in the marine environment, which has very important application values.

4 Claims, No Drawings

CONCRETE CRACK REPAIR MATERIAL BASED ON NANO MATERIALS AND ITS PREPARATION METHOD

FIELD OF THE DISCLOSURE

The disclosure relates to the technical field of construction materials, and in particular to a concrete crack repair material based on nano materials and its preparation method.

BACKGROUND OF THE DISCLOSURE

Concrete cracks are physical structural changes due to an action of internal and external factors in a concrete structure, which are a main reason for a reduction of load-bearing capacity, durability and water resistance of the concrete structure. Concrete in a marine environment is more susceptible to crack and flake caused by its corrosion due to a long-term disturbance of seawater and sea breeze, and the concrete cracks provide channels for chloride ions, carbon dioxide, sulfate ions and other erosive media, which will accelerate the corrosion of materials and failure of the concrete structures, and even bring huge economic losses and serious safety problems.

At present, there are reports on the concrete crack repair material, but most of them are for repairing cracks in pavement concrete, while there are the corrosive sulfate ions, the chloride ions and the other erosive ions in the marine environment, the repairing cracks in the marine environment are subjected to the long-term erosion by the sea breeze, which are difficult to ensure the concrete repair effect in this extreme environment. Therefore, how to repair the concrete cracks in the marine environment in a timely and effective manner is a technical problem that needs to be solved.

SUMMARY OF THE DISCLOSURE

The purposes of the disclosure are to provide a concrete crack repair material based on nano materials and its preparation method, in order to solve technical problems of easy erosion and poor repair effect of concrete in a marine environment. The disclosure reasonably selects raw materials of the concrete crack repair material and makes a reasonable ratio of the raw materials, the raw materials work together to produce the concrete crack repair material with good compressive strength, bending strength and bond strength, and excellent impermeability and frost resistance, and the concrete crack repair material can be used for the concrete crack repair in the marine environment.

To achieve the above purpose, the disclosure provides following solutions.

One of the purposes of the disclosure is to provide the concrete crack repair material based on nano materials, including raw materials in parts by weight as follows:
seaweed, 5~10 parts;
sulphoaluminate cement, 40~50 parts;
natural sand, 10~15 parts;
nano-silica fume, 20~30 parts;
calcium formate, 5~10 parts;
fly ash, 5~10 parts;
anhydrous calcium sulphoaluminate, 5~8 parts;
a polyester fiber, 1~2 parts;
a water reducing agent, 0.2~0.5 parts;
a corrosion inhibitor, 5~10 parts; and
water, 24~30 parts.

In an embodiment, the seaweed is waste seaweed.

In an embodiment, a particle size of the nano-silica fume is in a range of 30 nm to 80 nm, and purity of the nano-silica fume is 99.9%.

In an embodiment, the polyester fiber is a short-cut fiber with a tensile strength greater than 900 MPa and elasticity modulus greater than 10 GPa.

In an embodiment, the water reducing agent is naphthalene superplasticizer in which a content of $Na_2SO_4$ is less than 3%.

In an embodiment, the corrosion inhibitor includes polyethyleneimine, sodium silicate, ammonium persulfate, and xylene thiourea.

In an embodiment, a mass ratio of the polyethyleneimine:the sodium silicate:the ammonium persulfate:the xylene thiourea is (2~5):(5~8):(3~5):(1~2).

Another purpose of the disclosure is to provide a method for preparing the concrete crack repair material based on the nano materials, including the following steps:

step 1, drying and grinding the waste seaweed into seaweed powder;

step 2, mixing the seaweed powder, the sulphoaluminate cement, the natural sand, and the fly ash to obtain a first mixture, then adding the water reducing agent, the corrosion inhibitor, and the water into the first mixture to obtain a second mixture and stirring the second mixture; and step 3, adding the polyester fiber, the nano-silica fume, the calcium formate, and the anhydrous calcium sulphoaluminate into the second mixture, and stirring evenly to obtain the concrete crack repair material based on the nano materials.

In an embodiment, in step 1, the waste seaweed is crushed to 80~100 meshes.

In an embodiment, in step 2, an addition amount of the water is 0.6 times of a mass of the sulphoaluminate cement.

In an embodiment, in step 2, a stirring speed is 200~300 r/min and a stirring time is 5~10 minutes.

In an embodiment, in step 3, a stirring speed is 100~150 r/min and a stirring time is 10~15 minutes.

The technical effects of the disclosure are as follows:

the sulphoaluminate cement has early strength and high strength properties, high frost resistance, corrosion resistance, and high impermeability. The waste seaweed is rich in protein and seaweed fibers, and also contains sodium, potassium, iron, calcium and other trace elements, which can be used in the preparation of the concrete crack repair material to increase the bonding force between the repair material and the crack, so that the concrete after filling the crack is well sealed. The natural sand and the fly ash are used as fillers to fill the crack, and the nano-silica fume is used as a water repellent, which has excellent waterproof and impermeable effect. The addition of the calcium formate can accelerate a hardening speed of cement, shorten the setting time, and make the cement release quickly, so that the cement can be put into use as soon as possible. The anhydrous calcium sulphoaluminate is a concrete expansion agent with good durability and stable expansion performance, which can greatly improve an anti-cracking and waterproofing ability of the concrete structure. The polyester fiber has the good tensile strength and the elasticity modulus, and has the effect of strengthening and toughening, which can enhance a bridging ability of the concrete crack repair material and make a composite material have strain-hardening performance and enhance a tensile deformation ability. The naphthalene superplasticizer is non-air-entraining superplasticizer synthesized by chemical industry, and the naphthalene superplasticizer has a strong dispersing effect on cement particles, high water reduction rate, low impact on setting time, good adaptability to cement, and can be used with various other admixtures to improve comprehensive performance of the repair materials. The addition of corrosion inhibitor can prevent intrusion of chloride, sulfate and water into the concrete, thus improving its corrosion resistance.

The disclosure reasonably selects the waste seaweed, the sulphoaluminate cement, the natural sand, the nano-silica fume, the calcium formate, the fly ash, the anhydrous calcium sulphoaluminate, the polyester fibers, the water reducing agent and the corrosion inhibitor, and makes a reasonable ratio to obtain the concrete crack repair material with excellent performance, the concrete crack repair material has good compressive strength, bending strength and bond strength, and excellent impermeability and frost resistance, and can be used for the concrete crack repair in the marine environment and has very important application values.

DETAILED DESCRIPTION OF EMBODIMENTS

Various exemplary embodiments of the disclosure are described in detail. Detailed description should not be considered as limiting disclosure, but should be understood as a more detailed description of certain aspects, features and embodiments of the disclosure.

It is to be understood that terms described in the disclosure are intended to describe particular embodiments only and are not intended to limit the disclosure. Further, for a range of values in the disclosure, it is to be understood that each intermediate value between upper and lower limits of the range is also specifically disclosed. Each smaller range between any stated value or the intermediate value within a stated range and any other stated value or the intermediate value within a stated range is also included in the disclosure. The upper and lower limits of these smaller ranges may be independently included or excluded from the scope.

Unless otherwise stated, all technical and scientific terms used herein have the same meaning as commonly understood by those skilled in the art of the disclosure. Although only preferred methods and materials are described herein, any methods and materials similar or equivalent to those described herein may be used in the performance or testing of the disclosure. All literature referred to in a specification is incorporated by reference for the purpose of disclosing and describing the methods and/or materials associated with the literature. In the event of conflict with any incorporated literature, the contents of the specification shall prevail.

Without departing from the scope or spirit of the disclosure, various improvements and variations may be made to specific embodiments of the specification of the disclosure, as will be apparent to those skilled in the art. Other embodiments obtained from the specification of the disclosure will be apparent to those skilled in the art. The specification and embodiments of the disclosure are only illustrative.

Terms "involving", "including", "having", "containing" and so on used in the specification are open terms, which mean including but not limited to.

In the disclosure, all raw materials are conventional commercially available products.

Embodiment 1 step 1, drying and crushing 8 parts of waste seaweed to 90 meshes to obtain seaweed powder;

step 2, mixing the seaweed powder, 45 parts of sulphoaluminate cement, 12 parts of natural sand and 7 parts of fly ash to obtain a first mixture, then adding 0.2 parts of naphthalene superplasticizer, 8 parts of corrosion inhibitor (a mass ratio of polyethyleneimine:sodium silicate:ammonium persulfate:xylene thiourea in the corrosion inhibitor is 3:7:4:2) and 27 parts of water into the first mixture to obtain a second mixture and stirring the second mixture for 8 minute (min) at 250 r/min; and step 3, adding 1.5 parts of polyester fibers, 27 parts of nano-silica fume, 6 parts of calcium formate and 7 parts of anhydrous calcium sulfoaluminate into the second mixture successively, and stirring at 120 r/min for 13 min to obtain a concrete crack repair material based on nano materials.

Embodiment 2 step 1, drying and crushing 5 parts of waste seaweed to 100 meshes to obtain seaweed powder;

step 2, mixing the seaweed powder, 40 parts of sulphoaluminate cement, 10 parts of natural sand and 10 parts of fly ash to obtain a first mixture, then adding 0.1 parts of naphthalene superplasticizer, 5 parts of corrosion inhibitor (the mass ratio of polyethyleneimine:sodium silicate:ammonium persulfate:xylene thiourea in the corrosion inhibitor is 2:8:3:2) and 24 parts of water into the first mixture to obtain a second mixture, and stirring the second mixture for 10 min at 200 r/min; and step 3, adding 1 part of polyester fiber, 30 parts of nano-silica fume, 5 parts of calcium formate and 8 parts of anhydrous calcium sulfoaluminate into the second mixture successively, and stirring at 100 r/min for 15 min to obtain a concrete crack repair material based on nano materials.

Embodiment 3 step 1, drying and crushing 10 parts of waste seaweed to 80 meshes to obtain seaweed powder;

step 2, mixing the seaweed powder, 50 parts of sulphoaluminate cement, 15 parts of natural sand and 5 parts of fly ash to obtain a first mixture, then adding 0.5 parts of naphthalene superplasticizer, 10 parts of corrosion inhibitor (the mass ratio of polyethyleneimine:sodium silicate:ammonium persulfate:xylene thiourea in the corrosion inhibitor is 3:7:4:2) and 27 parts of water into the first mixture to obtain a second mixture and stirring the second mixture for 8 min at 250 r/min; and step 3, adding 2 parts of polyester fiber, 20 parts of nano-silica fume, 10 parts of calcium formate and 5 parts of anhydrous calcium sulfoaluminate into the second mixture successively, and stirring at 150 r/min for 10 min to obtain a concrete crack repair material based on nano materials.

Comparative Example 1

The comparative example 1 is basically the same as the Embodiment 1, with the difference that no waste seaweed is added.

Comparative Example 2

The comparative example 2 is basically the same as the Embodiment 1, with the difference that the sulphoaluminate cement is replaced with silicate cement.

Comparative Example 3

The comparative example 3 is basically the same as the Embodiment 1, with the difference that no naphthalene superplasticizer is added.

Comparative Example 4

The comparative example 4 is basically the same as the Embodiment 1, with the difference that no corrosion inhibitor is added.

Effectiveness Verification

The concrete crack repair materials obtained by the embodiments 1~3 and comparative examples 1~4 of the disclosure are tested according to the industry standard JC/T 984-2011 "polymer cement waterproof mortar", and the specific performance indexes of the concrete crack repair materials are shown in Table 1.

TABLE 1

| Project | Compressive strength/MPa | | | Bending strength/MPa | | | Bond Strength/ MPa | Impermeability Pressure (28 d)/MPa | Frost resistance - freeze-thaw cycle (−45~20° C.), 25 times |
|---|---|---|---|---|---|---|---|---|---|
| | 2 d | 3 d | 28 d | 2 d | 3 d | 28 d | | | |
| Embodiment 1 | 28.2 | 47.4 | 75.6 | 5.8 | 9.6 | 13.3 | 4.8 | 2.6 | No cracking, no flaking |
| Embodiment 2 | 26.5 | 43.7 | 72.5 | 5.6 | 8.8 | 12.8 | 4.5 | 2.4 | No cracking, no flaking |
| Embodiment 3 | 26.4 | 45.8 | 73.2 | 5.2 | 8.6 | 12.5 | 4.6 | 2.3 | No cracking, no flaking |
| Comparative Example 1 | 24.1 | 40.5 | 68.4 | 4.2 | 7.5 | 11.6 | 1.8 | 1.5 | Slight cracking and flaking |
| Comparative Example 2 | 18.6 | 34.2 | 57.4 | 3.2 | 6.8 | 7.5 | 3.6 | 2.0 | Slight cracking and flaking |
| Comparative Example 3 | 20.6 | 38.2 | 60.5 | 3.5 | 7.2 | 10.4 | 4.2 | 2.1 | Severe cracking and flaking |
| Comparative Example 4 | 19.8 | 35.7 | 60.3 | 3.3 | 7.0 | 10.2 | 4.0 | 1.2 | Severe cracking and flaking |

The embodiments described above are only a description of the preferred way of the disclosure, not a limitation of the scope of the disclosure. Without departing from the spirit of the design of the disclosure, all kinds of deformations and improvements made to the technical solutions of the disclosure by those skilled in the art shall fall within the scope of protection determined by the claims of the disclosure.

What is claimed is:

1. A preparation method of a concrete crack repair material based on nano materials, wherein the concrete crack repair material based on the nano materials comprises raw materials in parts by weight as follows:
   seaweed, 5-10 parts;
   sulphoaluminate cement, 40-50 parts;
   natural sand, 10-15 parts;
   nano-silica fume, 20-30 parts;
   calcium formate, 5-10 parts;
   fly ash, 5-10 parts;
   anhydrous calcium sulphoaluminate, 5-8 parts;
   a polyester fiber, 1-2 parts;
   a water reducing agent, 0.2-0.5 parts;
   a corrosion inhibitor, 5-10 parts; and
   water, 24-30 parts;
   wherein the preparation method of the concrete crack repair material comprises the following steps:
   step 1, drying and grinding the seaweed into seaweed powder;
   step 2, mixing the seaweed powder, the sulphoaluminate cement, the natural sand, and the fly ash to obtain a first mixture, then adding the water reducing agent, the corrosion inhibitor, and the water into the first mixture to obtain a second mixture, and stirring the second mixture; and
   step 3, adding the polyester fiber, the nano-silica fume, the calcium formate, and the anhydrous calcium sulphoaluminate into the second mixture and stirring evenly to obtain the concrete crack repair material based on the nano materials;
   wherein a particle size of the nano-silica fume is in a range of 30 nm to 80 nm, and purity of the nano-silica fume is 99.9%;
   wherein the corrosion inhibitor comprises: polyethyleneimine, sodium silicate, ammonium persulfate, and xylene thiourea;
   wherein the seaweed is waste seaweed;
   wherein the water reducing agent is a naphthalene superplasticizer in which a content of $Na_2SO_4$ is less than 3%;
   wherein a mass ratio of the polyethyleneimine:the sodium silicate:the ammonium persulfate:the xylene thiourea is (2-5):(5-8):(3-5):(1-2); and
   wherein the waste seaweed is crushed to 80-100 meshes.

2. The preparation method according to claim 1, wherein in step 2, an addition amount of the water is 0.6 times of a mass of the sulphoaluminate cement.

3. The preparation method according to claim 1, wherein in step 2, a stirring speed is in a range of 200 r/min to 300 r/min and a stirring time is in a range of 5 minutes (min) to 10 min.

4. The preparation method according to claim 1, wherein in step 3, a stirring speed is in a range of 100 r/min to 150 r/min and a stirring time is in a range of 10 min to 15 min.

* * * * *